Sept. 25, 1956  R. J. WILLIAMS ET AL  2,764,227
FORMED SPRING UNITS AND ASSEMBLIES THEREOF
Filed May 17, 1951  6 Sheets-Sheet 1

INVENTORS.
Richard J. Williams
Hyland C. Flint.
BY
Harness, Dickey & Pierce
ATTORNEYS.

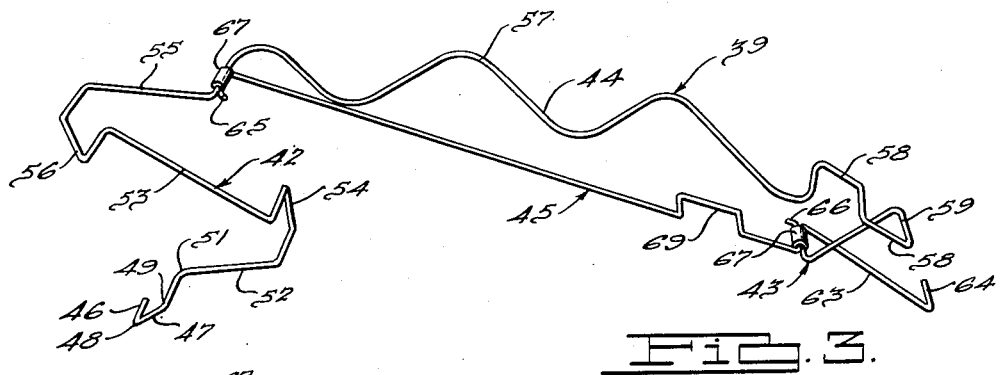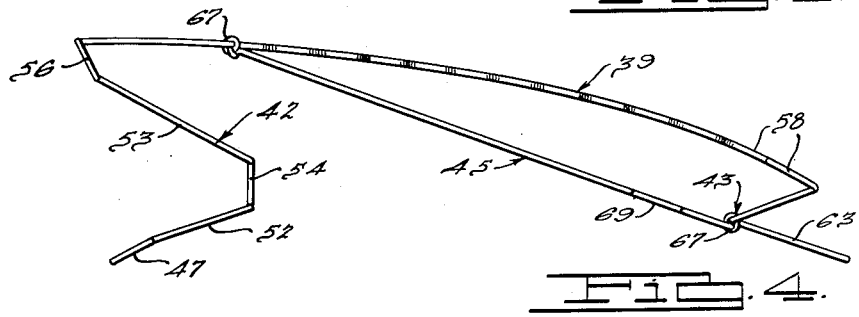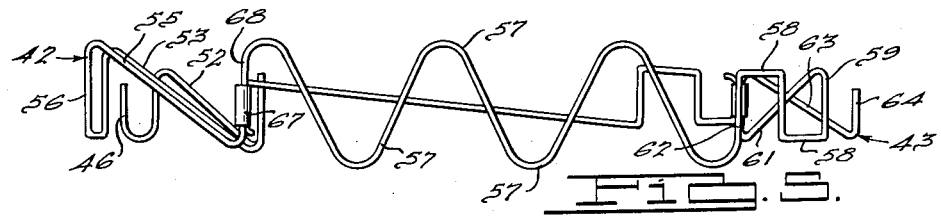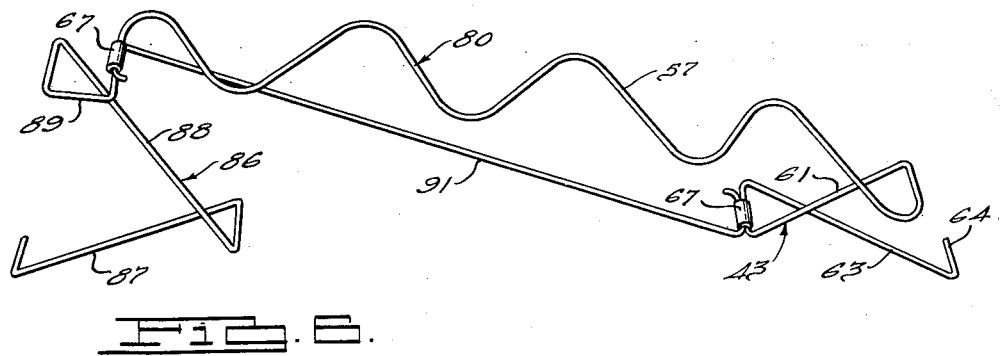

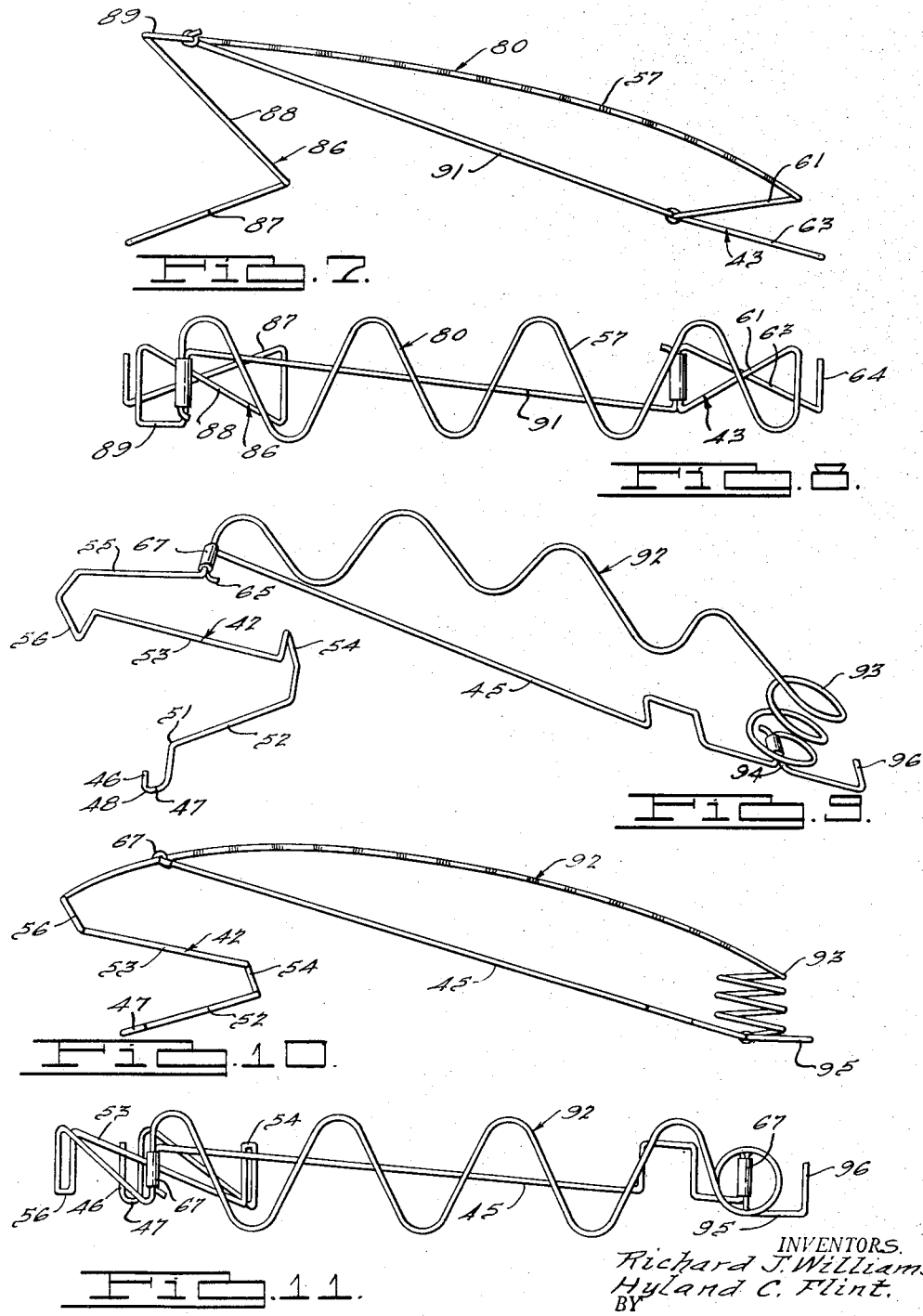

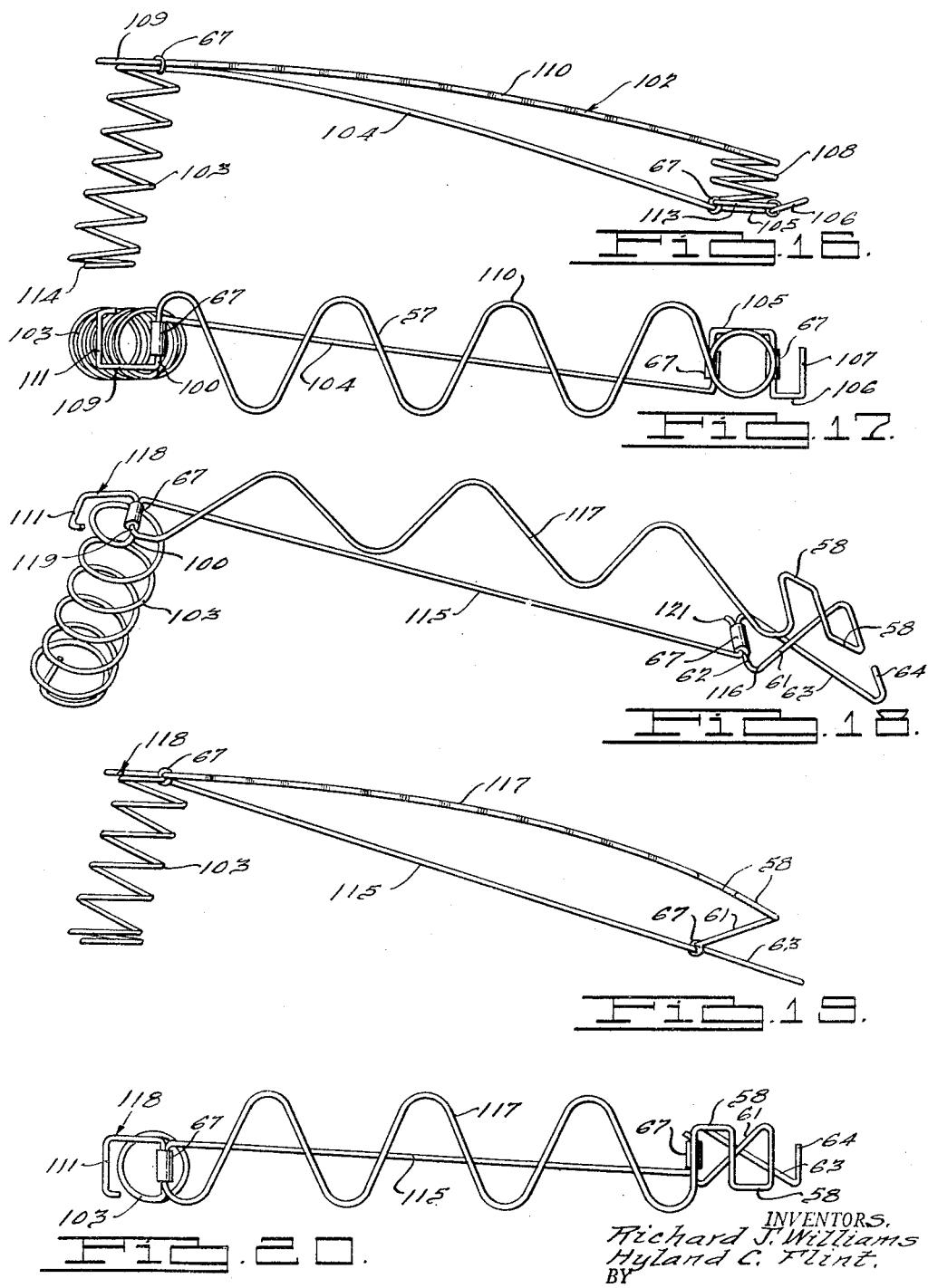

Sept. 25, 1956  R. J. WILLIAMS ET AL  2,764,227
FORMED SPRING UNITS AND ASSEMBLIES THEREOF
Filed May 17, 1951  6 Sheets-Sheet 6

INVENTORS.
Richard J. Williams,
Hyland C. Flint.
BY
Barness, Dickey & Pierce
ATTORNEYS United States Patent Office 2,764,227
Patented Sept. 25, 1956

2,764,227

FORMED SPRING UNITS AND ASSEMBLIES THEREOF

Richard J. Williams and Hyland C. Flint, Birmingham, Mich., assignors to American Metal Products Company, Detroit, Mich., a corporation of Michigan Application May 17, 1951, Serial No. 226,771

15 Claims. (Cl. 155—179)

This invention relates to spring assemblies and to the formed units employed therein, and particularly to formed units and assemblies thereof which are employed in seat cushion constructions.

Seat cushions have been constructed heretofore from coil springs which were mounted on webbing, on a base panel or joined together at the bottom by metal strips to form spring unit assemblies secured to the base frame of the cushion. Zigzag springs made of wire bent back and forth to provide uniform loops joined by straight portions were employed initially in combination with the coil springs being employed in place of the fabric webbing above mentioned and were later formed into units which spanned the frame and which superseded the coil springs. In view of the fact that the strip forming the unit had uniform characteristics throughout the length thereof, such units were limited in application and required supplemental elements to produce soft edges, to reinforce such assemblies, and to produce the desirable contour to the seating portion when loaded.

The present invention is a further advancement in the art of spring construction in providing spring units which are directly applied to the frame. The units, instead of being formed from a uniform strip such as a sinuous zigzag strip above mentioned, are formed from a wire in a manner to provide a supporting portion at each end of the unit, joined at the top by a seating portion having a nesting characteristic with the seating portions of adjacent springs. This eliminates the transverse open space which extended fore and aft in unit assemblies heretofore provided. The spacings between the load supporting portions of the present invention are of sinuous form which support the padding placed on the top thereof in a manner to prevent parallel transverse sections of the padding from passing downwardly between the provided transverse spaces. The units are so constructed as to utilize a minimum amount of wire while forming the wire at points where deflection occurs in a manner to permit such deflection without fatigue.

It is, therefore, the main object of the invention to provide a formed unit for a spring assembly which utilizes a minimum amount of wire, with the points of major deflection reinforced to withstand fatigue.

It is a further object of the invention to provide a formed unit for a spring assembly having a lower load supporting portion which operates in conjunction with an upper seating portion which deflects to predetermined contour when loaded.

It is a still further object of the invention to provide a unit spring assembly from spring end supporting portions, having sections of wire extending therefrom and joined to the opposite spring supporting portion in vertically spaced relation to each other.

It is a still further object of the invention to form a spring unit from a pair of spaced springs from one of which a tie rod extends to the other and from the other of which a seating portion extends above the tie rod to the other spring.

It is a still further object of the invention to form a spring unit for a spring assembly from a front spring element having a spring seating portion extending rearwardly therefrom and cooperating with a rear spring element having a tie rod portion joining the rear spring element to the front spring element below the seating portion thereof.

It is a still further object of the invention to provide a spring unit for a spring assembly which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Fig. 3 is a perspective view of one of the spring units employed in the seat construction illustrated in Figs. 1 and 2;

Fig. 4 is a view in elevation of the spring unit illustrated in Fig. 3;

Fig. 5 is a plan view of the spring unit illustrated in Figs. 3 and 4;

Fig. 6 is a perspective view of a spring unit, similar to that illustrated in Fig. 3, showing a further form thereof;

Fig. 7 is a view in elevation of the spring unit illustrated in Fig. 6;

Fig. 8 is a plan view of the spring unit illustrated in Figs. 6 and 7;

Fig. 9 is a perspective view of a spring unit, similar to that illustrated in Fig. 3, showing a further form thereof;

Fig. 10 is a view in elevation of the spring unit illustrated in Fig. 9;

Fig. 11 is a plan view of the spring unit illustrated in Figs. 9 and 10;

Fig. 16 is a view in elevation of the spring unit illustrated in Fig. 15;

Fig. 17 is a plan view of the spring unit illustrated in Figs. 15 and 16;

Fig. 18 is a perspective view of a spring unit, similar to that illustrated in Fig. 1, showing another form which the invention may assume;

Fig. 19 is a view in elevation of the spring unit illustrated in Fig. 18;

Fig. 20 is a plan view of the spring unit illustrated in Figs. 18 and 19;

Figure 1:
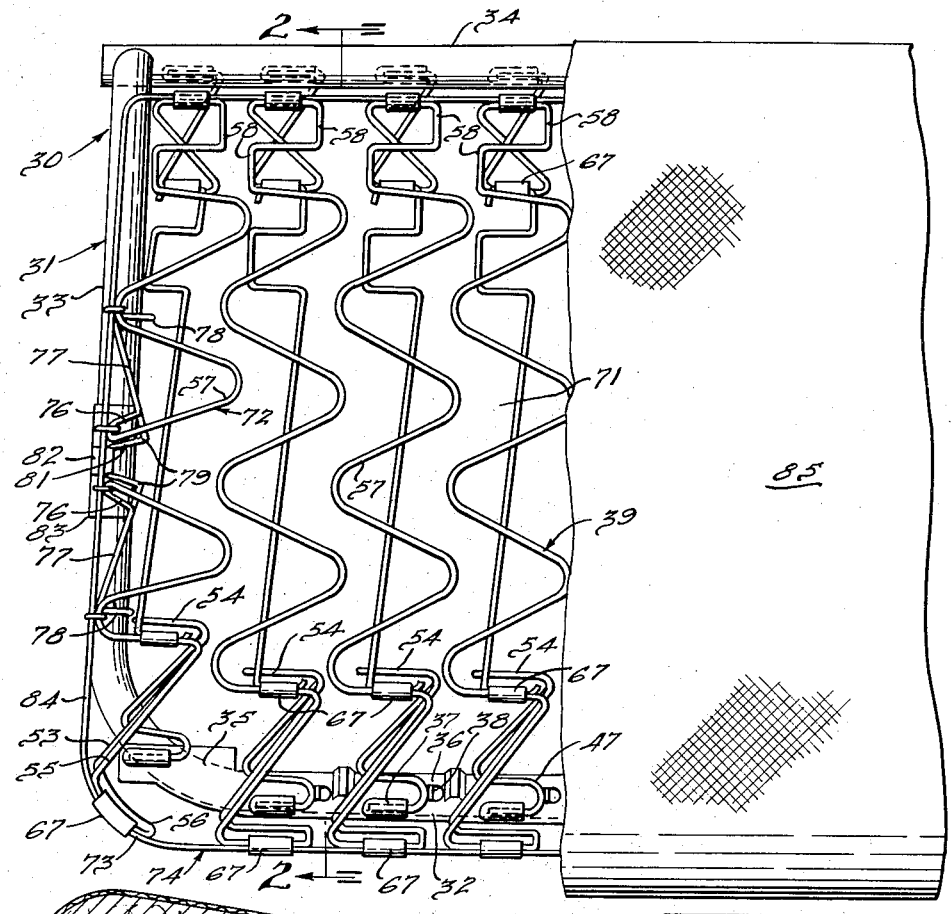
Figure 1 is a broken plan view of a seat construction having spring units therein embodying features of the present invention.

Referring to Figure 1, a seat cushion is illustrated embodying a frame 30 formed in the manner herein illustrated from a tubular element, the portion 31 of which is of U-shape providing a front frame member 32 and extending side frame members 33. The ends of the side frame members 33 join a rear frame member 34. The front and side frame members are joined by arcuate corner portions 35. The front and rear frame members 32 and 34 have strips 36 welded thereto provided with tunnels 37 and tabs 38 in predetermined spaced relation along the frame members. These strips 36 are similar to those described and claimed in the patent to Richard J. Williams et al. No. 2,526,184, issued October 17, 1950. The strips 36 support a plurality of similar spring units 39 between the front and rear frame members 32 and 34 and the formed strips 72 employed at each side of the spring assembly.

Referring to Figs. 3, 4 and 5, the spring unit 39 embodies a wire which is formed to provide a front spring supporting portion 42, a rear spring supporting portion 43, a top seating portion 44, with the front and rear spring elements 42 and 43 joined by a tie rod 45. The spring unit is formed from a minimum length of wire, the points of deflection being reinforced to withstand fatigue. This is illustrated more specifically with regard to the front spring portion 42 wherein the laterally disposed free end portion 46 is provided to extend within the tunnel 37 of the strip 36, the loop portion 47 being engaged by the tab 38 when rotated down against the main portion of the strip 36 to maintain the end 46 within the tab and the spring from rotating downwardly. Since the end portion 46 resting upon the strip 36 supports the front portion of the spring unit, substantial stress will occur to the bend 48, and to relieve this bend from excess strains and fatigue, additional bends 49 and 51 are provided by the formation of a loop 47 to thereby eliminate the overstressing of the wire at the bend 48. Similarly, the straight portion of the wire 52, being subject only to deflection, will withstand such deflection without undue strain or fatigue and thereby no additional loops are provided therein. This is also true of the straight portion 53 of the spring portion 42. The junction between the two, however, being subject to substantial strain, a laterally disposed loop 54 is provided at this point so that, instead of a single bend, four bends are provided over which the stress, strains and fatigue are distributed.

The straight portion 53 is joined to the straight portion 55 by a similar laterally disposed loop 56 which distributes the stresses, strains and fatigue occurring at the junction thereof over the four bends rather than over one as would occur if the loop were not provided. In this manner, the spring portion 42 is formed of straight portions of wire where no undue strains occur, which straight portions are joined by loop portions where undue strains would be set up, to distribute such strains over a plurality of bends, thereby eliminating the undue stress which would otherwise occur to the single bend. In such an arrangement a minimum amount of wire is provided to produce the spring portion 42 of the unit. For producing width to the strip and a seating portion 44 having the proper contour when loaded and deflected, the front spring portion is extended rearwardly and is formed laterally in large V-shaped loops 57 which terminate in smaller loops 58 at the rear end. The loop portions 58 are subject to substantial deflection and the stresses are distributed over the plurality of bends, eliminating fatigue and rupture. The end 59 of the end loop 58 is bent downwardly at 61, formed laterally at 62 and downwardly at 63, and extended laterally at 64 to form an end which is projectable within a tunnel 37 to form a support for the rear spring portion 43.

It will be noted that the downwardly directed straight portion 61 and the downwardly directed straight portion 63 in plan view cross each other, to thereby provide stability to the spring portion 43 along the longitudinal center line of the spring unit. Further, it will be noted in the left-hand end of the unit, that the spring 42 has the loop 54 extending in one direction, the loop 56 extends in the opposite direction, and the straight wire portions 52, 53 and 55 are disposed at an angle to the longitudinal center line of the unit. It will also be noted that the extending end 46 is substantially on the longitudinal center line aligned with the extending end 64 of the spring portion 43. The tie rod 45 has oppositely extending end portions 65 and 66 which are secured to the transverse portion 62 of the spring portion 43 by a clamping band 67, while the end 65 is joined to the transverse portion 68 at the end of the wire portion 55 and of the V portions 57 by a clamping band 67. A loop portion 69 is provided within the length of the tie rod to permit slight longitudinal extension thereof.

The tie rod 45 forms a spring support with the rear wire portion 63 of the spring portion 43 and with the front spring portion 42 of the unit beneath the seating portion thereof which is free to assume a proper contour when loaded as the rear end portion composed of the loops 58 is free to deflect downwardly relative thereto. This provides a seating portion which produces the desirable contour above the load supporting portion of the unit made up of the wire 63 and the tie rod 45. This substantially reduces the thickness of the supporting spring portion at the rear of the unit so that when mounted on the frame, toe room is provided therebelow while permitting the rear portion of the unit to freely deflect.

Figure 2:
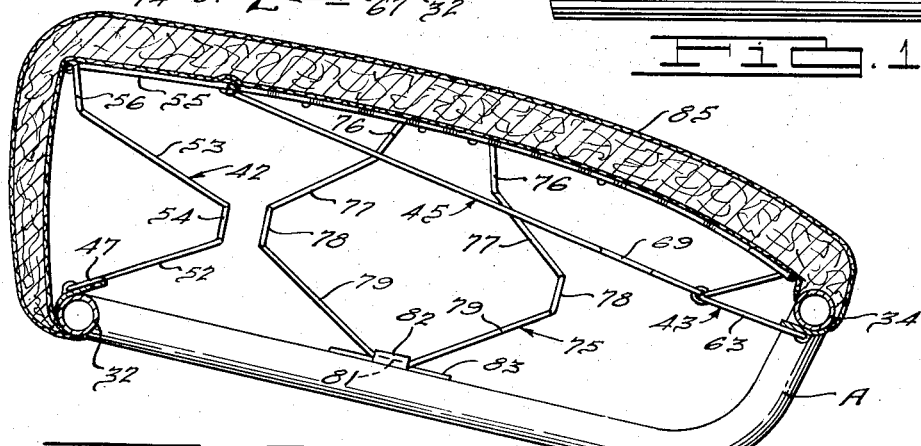
Fig. 2 is a sectional view of the structure illustrated in Fig. 1, taken on the line 2—2 thereof.

When a plurality of the units are assembled on the frame, as illustrated in Figs. 1 and 2, the apices of the V portion 57 of the load supporting portion of the unit will be in aligned or nested relation with each other so as to eliminate a transverse or front-to-rear spacing of the units in which the padding may deflect. The spacing 71 herein provided is of sinuous form and capable of providing a better support for the pad material. The proper contouring of the seating portion of the unit is obtained through the particular formation of the wire, the straight portion at the front which has little deflection or contour change, the central portion which assumes a change in contour when loaded, and the rear deflectable portion formed with oppositely disposed loops. The number and width of the loops may be varied throughout the length of the spring for changing the resulting contour when loaded. This is made possible as each wire of the unit is separately formed to the desired shape. Because of the individual forming, loops are only provided where desired and the seating portion 44 can be formed of any shape loops of varying width and length at different points throughout the length of the seating portion. At points where fatigue and breakage might occur at different portions of the assembled unit, it is only necessary to provide an additional loop to the wire so as to distribute the strains over several bends, relieving the single bend from excess fatiguing.

It will be noted that a similar type of spring element 72 is employed at each end of the assembly, the elements being the same except for one being of right and the other of left-hand construction. The loop 56 extends at such angle from the wires 55 and 53 as to follow the curve 73 of the border wire 74. The border wire is secured to the top element 56 of the units 39 by the bands 67. Similar bands 67 secure the top portion of the curved loop 56 of the unit 72 to the arcuate portion 73 of the border wire. The end of the central V loop 57 of the unit 72 is formed downwardly to provide the supporting portion 75 of the unit. In this arrangement each of the wires is looped rearwardly at 76 and sloped downwardly and outwardly at 77 and formed into a loop 78 and sloped inwardly and toward each other at 79 and formed into a bottom loop 81. The loop 81 is secured to a clip 82 on a plate 83 which is welded or otherwise secured to the side frame members 33. It will be noted in Fig. 2 that the seat in which the units are supported has the rear frame member 34 elevated a substantial amount above the front frame member 32 so as to provide a substantial distance, indicated at A, below the rear frame member 34 to permit the feet of the occupant of the rear seat of the vehicle to extend under the border member into the area A, thereby substantially increasing the foot room in the rear compartment of the vehicle. The supporting portion 75 thus formed in the end unit 72 reinforces the side portion 84 of the border wire 74 and the endmost spring unit 72, which is desirable to limit the deflection of the side edges of the seat when the side edges alone are occupied. Suitable padding and upholstery material 85 are applied to the assembly in the conventional manner. It will be noted that the seating portion 44 of the unit, including the wire portion 55 and the loops 58, is disposed on a slight arc to provide contour to the assembled units and shape to the seating surface when the padding and upholstery material 85 is added thereto.

In Figs. 6, 7 and 8 the spring unit 80 therein illustrated is similar to the spring unit 39 illustrated in Figs. 1 to 5, with the exception that certain of the loops have been omitted because in certain applications they were found to be unnecessary. In other words, the spring unit 80 illustrated in Figs. 6, 7 and 8 is utilized when the spring portions thereof are not subjected to the amount of stress and strain as the unit 39. In this arrangement it will be noted that the rear spring portion 43 is the same as that of the unit 39, the seating portion 44 is the same with the exception that the rearmost loops 58 are omitted therefrom. The front supporting spring portion 86 is similar to the rear spring portion 43 having the loops 47, 54 and 56 of the spring portion 42 of the unit 39 omitted. The leg portions 87 and 88 of the spring portion 86 are disposed in cross relation, the same as the leg portions 61 and 63 of the spring portion 43. A loop 89 is provided at the top connected with the end V of the seating portion 44 to minimize the strains at the top forward portion of the unit. A tie bar 91, which joins the front and rear spring portions 86 and 43 respectively, is similar to the tie bar 45 with the exception that the loop 69 is omitted therefrom. The spring unit functions in the same manner as the spring unit illustrated in Figs. 3, 4 and 5, the application being satisfactory on a seat cushion which is not subjected to as great a strain as that of the first described unit.

The spring unit 92 illustrated in Figs. 9, 10 and 11 is similar to the unit 39 illustrated in Figs. 3, 4 and 5. The difference in the unit resides in the employment of a coil spring 93 at the rear end, it being formed from an extension of the wire of the seating portion 44. The spring 93 has a diametrically disposed portion 94 at the bottom which extends rearwardly at 95 and laterally at 96, forming the attaching end. The tie rod 45 is attached to the diametrically disposed portion 94 of the coil spring 93 by the band 67, the opposite end being secured in a manner above described. In this arrangement, the coil spring 93 rests upon the rear supporting portions 95 and 96 which are disposed in extension of the tie bar 45, and the end of the seating portion 44 is free to form a desired contour, with the rear end portion capable of deflecting by the compression of the coil spring 93.

Figure 12:
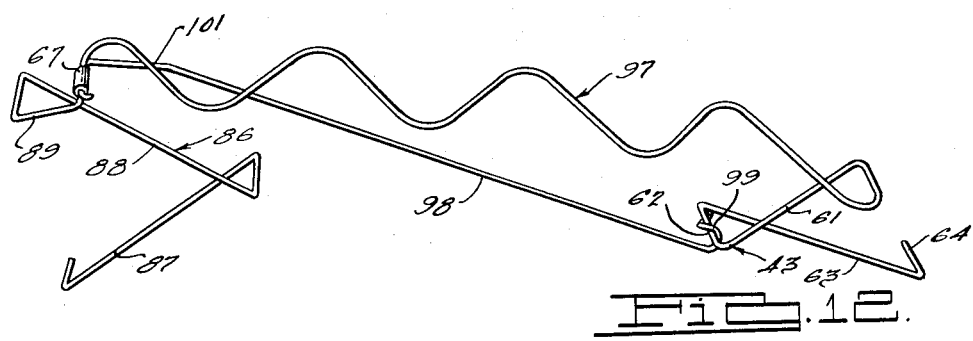
Fig. 12 is a perspective view of a spring unit, similar to that illustrated in Fig. 1, showing a still further form thereof.
Figure 13:
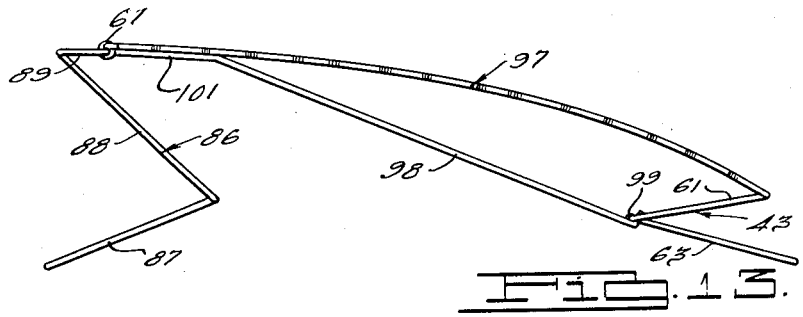
Fig. 13 is a view in elevation of the spring unit illustrated in Fig. 12.
Figure 14:
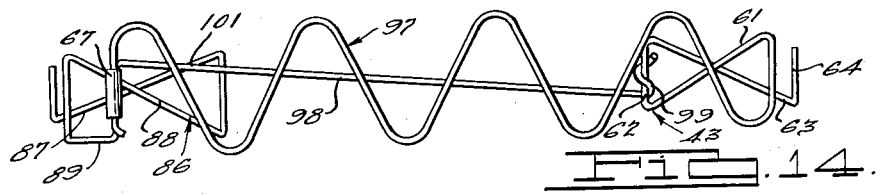
Fig. 14 is a plan view of the spring unit illustrated in Figs. 12 and 13.

Referring to Figs. 12, 13 and 14, a spring unit 97 is illustrated, similar to the unit 80 hereinabove described, with the exception that a tie rod 98 is employed thereon of different construction. The rod is made of wire having a coiled end 99 which may be hooked over the laterally extending portion 62 of the spring portion 43, the opposite end having an angularly disposed portion 101 which engages the forward V portion 57 of the seating portion 44 for the purpose of controlling the deflection thereof and the resulting contour to the seating portion. It is to be understood that the tie rod 98 may be substituted for the tie rods on the hereinabove described units when additional support is desired at the forward end of the seating portion for controlling the contour thereof, as pointed out hereinabove.

Figure 15:
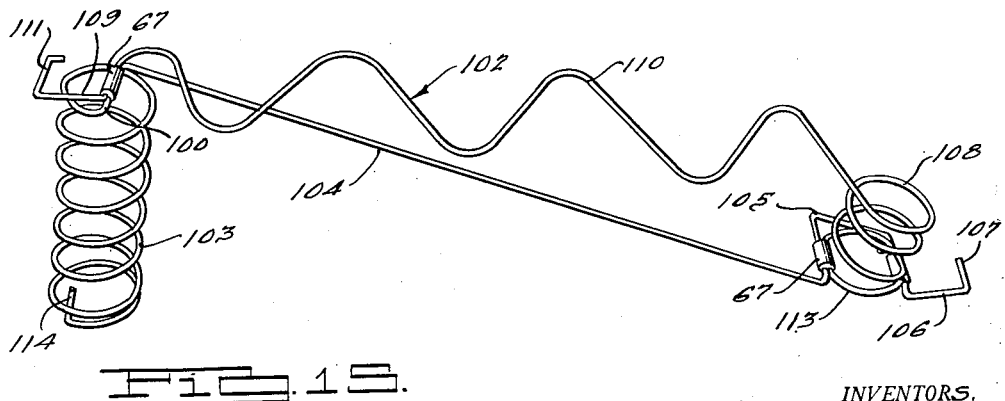
Fig. 15 is a perspective view of a spring unit, similar to that illustrated in Fig. 1, showing a still further form which the invention may assume.

In Figs. 15, 16 and 17, a spring unit 102 is illustrated, comprising a front coil spring 103 which terminates at the top in a diametrical portion 100 from which a tie rod 104 extends rearwardly. The tie rod at the rear end of the assembly has a loop 105 from which the end extending rearwardly at 106 is deflected laterally at 107, forming the anchor end for the rear of the unit. A coil spring 108 has a seating portion 110 extending forwardly thereof above the tie rod 104, it being bent in V-shape 57 except at the front end where a loop 109 is provided having a laterally extending front portion 111 to which the border wire is secured. Clamping bands 67 join the rear portion of the loop 109 to the diametrical portion 100 of the coil spring 103 and join the bottom turn 113 of the spring 108 to the side portions of the loop 105 at the rear end of the tie rod 104. The front end of the assembled unit is deflectable upon the front coil spring 103, the diametrically disposed end 114 of which is secured in a tunnel of the front frame member 32 in the manner as indicated hereinabove. The coil spring 108 rests upon the rear portion of the tie rod 104 and is deflectable relative thereto when the seating portion 110 provides a predetermined contour to the assembled units when loaded.

In Figs. 18, 19 and 20 a further form of spring unit is illustrated, that wherein a front supporting coil spring 103 has in extension of the diametrical portion 100 a tie rod 115. A rear supporting spring element 116 is similar to the spring portion 43 of the spring unit 39 illustrated in Figs. 3, 4 and 5. The spring portion 43 has in forward extension thereof a top seating portion 117 having at the rear end the oppositely disposed loops 58 referred to hereinabove, and at the front end a loop 118 similar to the loop 109 at the forward end of the top supporting element 110 of Figs. 15, 16 and 17. Clamping bands 67 join the diametrical portion 100 of the spring 103 to the laterally extending wall 119 of the loop 118, while a band 67 joins the laterally extending end 121 of the tie rod 115 to the lateral portion 62 of the spring portion 43. The unit is similar to the unit 102 with the exception that at the rear end the spring portion 43 is utilized in place of the coil spring 108.

Figure 21:
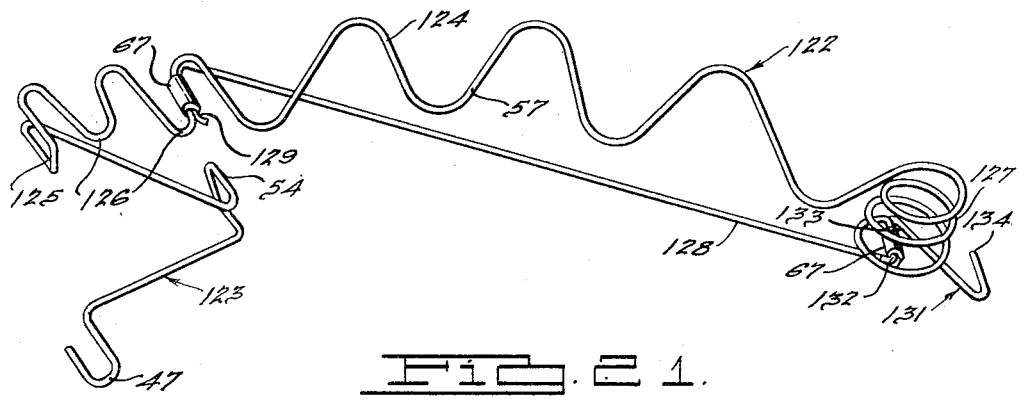
Fig. 21 is a perspective view of a spring unit, similar to those above illustrated, showing a still further form which the invention may assume.
Figure 22:
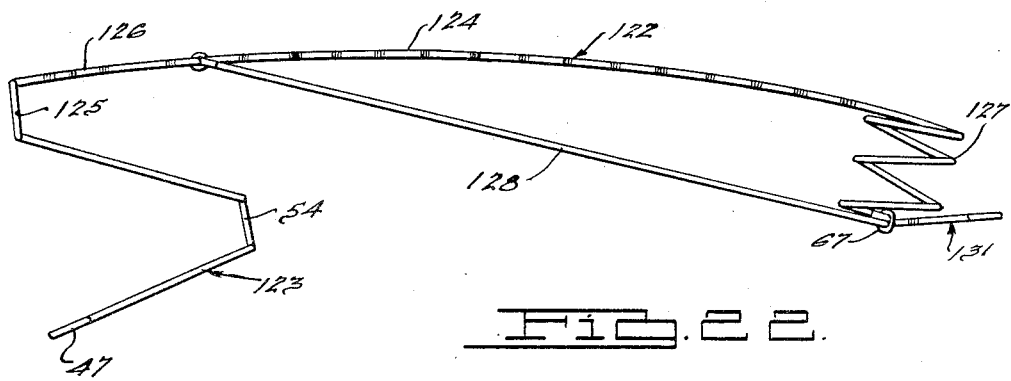
Fig. 22 is a view in elevation of the spring unit illustrated in Fig. 21.
Figure 23:
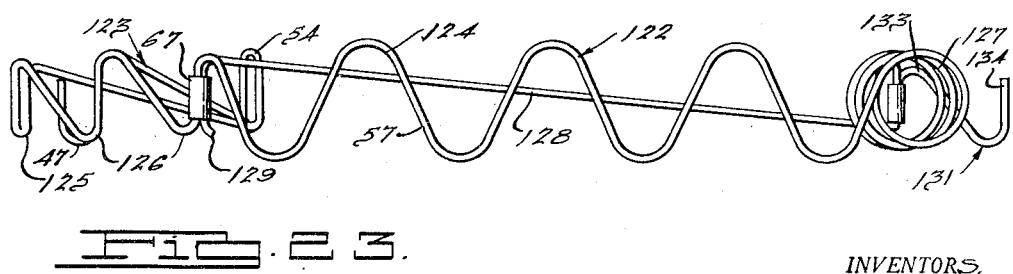
Fig. 23 is a plan view of the spring unit illustrated in Figs. 21 and 22.

A further form of spring unit 122 is illustrated in Figs. 21, 22 and 23. In this arrangement a front spring portion 123 is employed which is the same as the spring portion 43 of the spring unit 39 illustrated in Figs. 3, 4 and 5. A seating portion 124 extends rearwardly from the top loop 125 of the spring 123, the front portion of which has two Z-shaped loops 126 joined to a plurality of V-shaped loops 57. The endmost V-shaped loop has the wire extended and coiled into a spring 127. A tie rod 128 has a forward laterally extending portion 129 secured to the laterally extending portion of the rearmost Z-shaped loop 126 by a clamping band 67. The rear end of the rod 128 has an offset Z-shaped portion 131 therein, the laterally extending portion 132 of which is secured to the diametrical portion 133 at the bottom turn of the coil spring 127 by the band 67. The laterally disposed end 134 of the Z-shaped end portion 131 of the tie rod 128 forms an anchoring end at the rear of the unit. In this arrangement it will be noted that loops are provided in the spring 123 at the point receiving the most severe stressing and that Z-shaped loops 126 are utilized at the front end of the seating portion 124 to distribute the stress and strains occurring near the front end of the unit forwardly of the tie rod 128 while the large V-shaped loops 57 in the center of the seating portion will readily deflect to produce the desired contour. The rear end of the seating portion terminating in the coil spring 127 is free to deflect downwardly toward the tie rod 128 on which the bottom turn of the coil spring rests.

While applicant has herein illustrated and described a plurality of spring units which differ from each other in small details to show the various forms which may be employed to make up the particular type of spring unit, in its broad aspects the invention pertains to the utilization of a minimum length of wire to produce the spring unit while providing a maximum safety factor against breakage and producing a proper contour and load supporting characteristics to the unit. Primarily, the spring unit embodies spring terminal ends joined together at the top by a seating portion and interconnected therebeneath by a tie rod to provide a top contouring portion and a load resistant portion therebelow which operate as a unit to produce the proper load supporting characteristics and contouring of the seating portion of the unit. The unit in all of its various structural arrangements, as illustrated in the figures, has a deep front spring for supporting the front end of the unit and a shallow spring at the rear for providing toe space beneath the rear of the frame when the spring unit is employed as a front cushion in an automotive vehicle. When not so employed, the rear spring may be made of any depth as great as or even larger than the depth of the front spring. Since the spring unit was designed for the front seat of an automotive vehicle, the shorter spring supporting portion at the rear of the unit has been illustrated, but this should not be considered as limiting.

The elements which go to make up the units are constructed in an all-purpose wire machine in which cams operate various sizes of forming and coiling elements so that when a predetermined length of wire is fed therein the operation of the cam elements simultaneously or seriatim produces the various bends and formation in the wire, thereby providing the elements which go to make up the spring units. By forming the wire to provide reinforcement against fatigue only at the points of greatest stress, a minimum length of wire is thereby utilized which substantially reduces the cost of the unit. It is only necessary to apply two or three of the clamping bands to assemble the elements together and thereafter it is only necessary to anchor the laterally projecting ends of the assembled units in tunnels on the frame to secure the units thereon. It is to be understood that when desired a coiled wire, a rubber strip, clips and the like may be utilized for joining the seating portions of the units in the manner heretofore employed for tying the top surface of spring units together.

What is claimed is:

1. A spring unit made of a minimum length of wire comprising spring end portions made of straight sections of wire bent in V formation with torsion bars disposed laterally of the unit between certain of said straight sections for distributing strain over a plurality of the bars when deflected, a seating portion bent in V-shape to provide large open loops joining said spring end portions, and a tie rod joining one of said spring end portions to said seating portion.

2. A spring unit made of a minimum length of wire comprising spring end portions made of straight sections of wire bent in V formation beneath the ends of the unit, laterally disposed pairs of torsion bars disposed between some of the straight sections for distributing strain over a plurality of the bars, a seating portion bent in V shape to provide large open loops joining said spring end portions, and a tie rod joining one of said spring end portions to said seating portion, said tie rod having a loop therein to permit longitudinal extension thereof.

3. In a cushion construction, a frame made up of front and rear frame members spaced by side members, supporting means provided along said front and rear frame members, spring units comprising front and rear spring portions joined by a seating portion of different formation and by a tie rod beneath the seating portion, the ends of said spring element having means engageable with said supporting means by which said units are secured to said frame, the endmost spring units of the cushion having the seating portion medially of the end thereof formed into diamond shape therebelow and engageable with the side frame members to provide support at the side edges of the cushion medially of the front and rear edges thereof.

4. In a spring unit for a seat, wire formed to provide dissimilar spaced supporting spring end portions and an intermediate seating portion, said seating portion being of laterally sinuous configuration and of a width at least equal to the width of said end portions, said end portions being of substantially different configuration than said seating portion and thereby providing greater rigidity of said end portions, and a stay element joining one of said supporting spring end portions to the end of said seating portion opposite said one supporting spring whereby said seating portion first substantially conforms to a load placed thereon and said end portions then resiliently support said load.

5. A spring unit as defined in claim 4 wherein said one supporting spring end portion is at the rear of said seat and wherein said other end of said seating portion is at the front of said seat.

6. A spring unit as defined in claim 4 wherein at least a portion of said one supporting spring end portion overlies the adjacent end of said stay element.

7. A spring unit as defined in claim 4 wherein said stay element is formed to position a length thereof in engagement with a length of said seating portion to add support thereto when the seating portion is deflected.

8. A spring unit as defined in claim 4 wherein at least one of said supporting spring end portions comprises a coiled compression spring.

9. A spring unit as defined in claim 4 including a wire portion extending outwardly from adjacent the juncture of said seating portion and one of said supporting spring portions and comprising means for attachment to a cushion border wire.

10. A cushion having its load supporting surface yieldingly supported, the support for said surface including a spring formed of a single continuous length of wire whose central portion is bent laterally back and forth to form a load receiving portion and whose end portions are each formed to provide two straight lengths which are inclined downwardly and are connected at adjacent ends by a generally straight horizontal length which laterally spaces said ends of said straight lengths and which is substantially normal thereto whereby on depression of the surface of the cushion the other ends of said inclined straight lengths move relatively toward each other and said horizontal length yields torsionally.

11. A spring unit made of a minimum length of wire formed to define a seating portion of laterally sinuous configuration and supporting spring end portions, said end portions comprising straight lengths of wire having lateral ends connecting said straight lengths, both the vertical and horizontal projections of said straight lengths being angularly related to each other, and a tie rod secured to one of said supporting spring end portions and to said seating portion.

12. In a spring cushion construction, a frame having front and rear frame members joined by side members, elongated spring units spanning said front and rear frame members in side-by-side relation, said spring units each comprising a top seating portion having a length of wire formed to define a plurality of laterally disposed horizontal V-shaped sections and having end sections, said seating portion being of substantially greater lateral width than said end sections, and means securing said end sections to said front and rear frame members in closely adjacent side-by-side relation whereby the apexes of the V-shaped sections of each unit nest within V-notches in adjacent units.

13. A spring unit comprising a wire formed to define a laterally sinuous seating portion and integral supporting spring end portions, each of said supporting spring end portions comprising straight sections of wire arranged to define a pair of Z-shaped formations integrally joined at adjacent ends and arranged in angular relation in a vertical plane to diverge from said adjacent ends.

14. A spring unit as defined in claim 13 wherein corresponding portions of said Z-shaped formations of one of said supporting spring end portions are disposed in superimposed relation.

15. A spring unit as defined in claim 13 wherein corresponding portions of said Z-shaped formations of one of said supporting spring end portions are disposed in superimposed relation, and wherein the diagonals of the Z-shaped formations of the other supporting spring end portion are arranged in horizontally crossed relation as viewed vertically.

References Cited in the file of this patent

UNITED STATES PATENTS

| | | |
|---|---|---|
| 198,423 | Smith | Dec. 18, 1877 |
| 2,029,247 | Mercogliano | Jan. 28, 1936 |
| 2,165,306 | Shanahan | July 11, 1939 |
| 2,251,049 | Haberstump | July 29, 1941 |
| 2,332,041 | Asaro | Oct. 19, 1943 |
| 2,526,184 | Williams | Oct. 17, 1950 |
| 2,571,184 | Bateman | Oct. 16, 1951 |
| 2,602,487 | Flint | July 8, 1952 |
| 2,646,108 | Norman | July 21, 1953 |

FOREIGN PATENTS

| | | |
|---|---|---|
| 232,312 | Great Britain | Apr. 14, 1925 |
| 254,466 | Switzerland | Apr. 30, 1948 |